United States Patent [19]

Preater

[11] Patent Number: 4,765,189
[45] Date of Patent: Aug. 23, 1988

[54] OPTICAL SYSTEM FOR IN-PLANE STRAIN MEASUREMENT USING ELECTRONICS SPECKLE PATTERN INTERFEROMETRY

[75] Inventor: Richard W. Preater, Sevenoaks, England

[73] Assignee: National Research Development Corporation, London, England

[21] Appl. No.: 936,430

[22] Filed: Dec. 1, 1986

[30] Foreign Application Priority Data

Nov. 29, 1985 [GB] United Kingdom ............... 8529429

[51] Int. Cl.$^4$ .............................................. G01L 1/24
[52] U.S. Cl. ...................................... 73/800; 356/32
[58] Field of Search ................. 73/121, 800; 358/105; 356/32, 35

[56] References Cited

U.S. PATENT DOCUMENTS 3,879,988 4/1975 Jacobs .......................... 356/32 X
4,255,049 3/1981 Sahm et al. ...................... 356/32

Primary Examiner—Jerry W. Myracle
Attorney, Agent, or Firm—Cushman, Darby & Cushman

[57] ABSTRACT

Electronic speckle pattern interferometric apparatus for the measurement of the displacement of a surface under test comprises a source (10) of coherent radiation, a first curved reflecting surface (11) to reflect radiation from the source on having a curvature of opposite sign from the first curved reflecting surface, and an electro-optic combining device such as a television camera (15) to receive the radiation from the surface under test.

5 Claims, 1 Drawing Sheet

OPTICAL SYSTEM FOR IN-PLANE STRAIN MEASUREMENT USING ELECTRONICS SPECKLE PATTERN INTERFEROMETRY

This invention relates to testing apparatus and, in particular, to optical systems for in-plane strain measurement using electronic speckle pattern interferometry and to methods of strain measurement using such apparatus.

In apparatus for the electronic speckle pattern interferometric measurement of strain, a surface subject to displacement is illuminated with a beam of coherent radiation and viewed with a television camera which generates speckle images of the surface. Use of a pulsed source of coherent radiation permits the extension of the method to moving components. With rotating components, subtraction fringes may be recorded for component tangential velocities up to and beyond 100 m sec$^{-1}$. As the component speed is increased, however, fringe blurring occurs in regions where the horizontal component of velocity exceeds approximately 5 m sec$^{-1}$. This progressively reduces the area of fringe information to a narrow band at the horizontal diameter of 10 mm wide at 10000 r.p.m.

Some increase in the width of this band may be achieved by shortening the pulse duration from 50 ns to 20 ns. Further shortening may only be achieved by electronically chopping the pulse, but this reduces the available energy.

We have now found that these problems may be overcome by modification to the optical system.

According to the present invention there is provided apparatus for the measurement of the displacement of a surface under test comprising a source of coherent radiation, a first curved reflecting surface to reflect radiation from said source on to said surface under test and on to a second curved reflecting surface having a curvature of opposite sign from said first curved reflecting surfce, and electro-optic combining means to receive the radiation scattered from said surface.

An embodiment of the invention will now be described by way of example with reference to the accompanying drawing in which.

Figure 1:
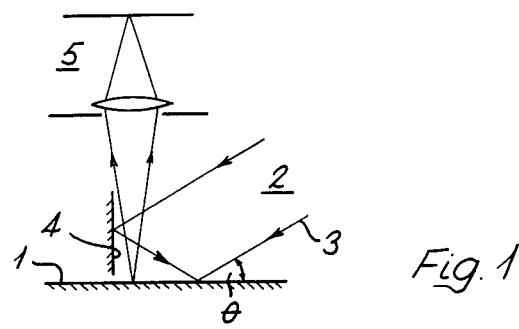
FIG. 1 shows schematically a prior art arrangement of electronic speckle pattern interferometric apparatus.
Figure 2A:
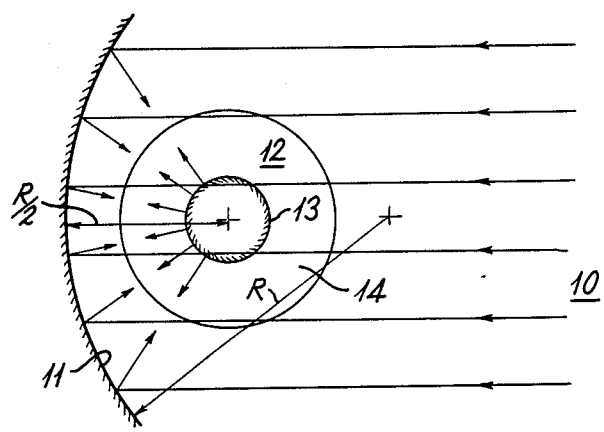
FIG. 2a is an elevated view of apparatus in accordance with the present invention.
Figure 2B:
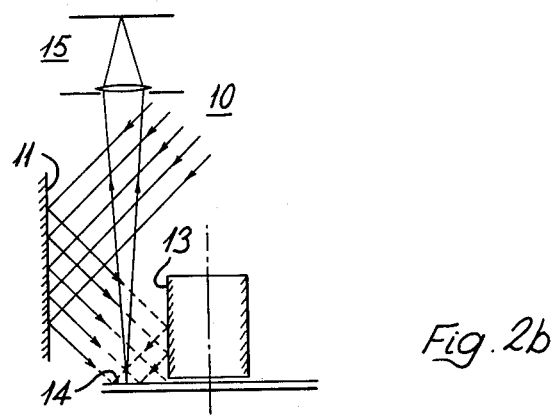
FIG. 2b is a plan view of the same apparatus.

Referring now to FIG. 1 of the drawings, a surface 1 under test is illuminated by a beam 2 of coherent radiation from a laser source (not shown). The illuminating beam reaches the surface by a direct route 3 and by reflection from a plane mirror 4. A television camera 5 creates speckle pattern images of the surface.

In an embodiment of the present invention, a beam of coherent radiation from a laser source 10 is reflected from a concave cylindrical mirror surface 11 on to a rotating object 12 and a convex cylindrical mirror 13. Radiation is reflected from the convex cylindrical mirror on to the surface under test 14 and an interference pattern observed by means of a television camera 15. The centre of curvature of the convex cylindrical mirror is preferably positioned at the principal focus of the concave cylindrical mirror.

Each meridional section now displays illumination in the form of the plane mirror prior art system. Sensitivity to displacement is thus in the radial direction throughout thus obviating fringe "blurring out" at higher speeds of rotation.

This new system is also applicable to the testing of rotating components whose surface cannot be sprayed with matt white paint to scatter the radiation towards the camera. It finds particular application in the testing of automotive brake discs. In this application, with the prior art illumination, specular reflection occurs in conjunction with a reduction of the available light scattered from the surface under test. Improvement results from the use of cylindrical reflecting surfaces.

What is claimed is:

1. Apparatus for the measurement of the displacement of a surface under test, comprising:
   a source of coherent radiation;
   a first curved reflecting surface arranged for reflecting radiation from said source onto a surface under test;
   a second curved reflecting surface having a curvature of opposite sign from said first curved reflecting surface, said second reflecting surface being arranged for reflecting radiation reflected from said source via said first curved reflecting surface; and
   electro-optic combining means arranged for receiving the radiation scattered from said surface.

2. Apparatus for the measurement of the displacement of a surface under test as claimed in claim 1 wherein said first curved reflecting surface comprises a concave cylindrical mirror.

3. Apparatus for the measurement of the displacement of a surface under test as claimed in claim 1 wherein said second curved reflecting surface comprises a convex cylindrical mirror.

4. Apparatus for the measurement of the displacement of a surface under test as claimed in claim 3 wherein the centre of curvature of the convex cylindrical mirror is positioned substantially at the principal focus of the concave cylindrical mirror.

5. Apparatus for the measurement of the displacement of a surface under test as claimed in any one of claims 1 to 4 wherein said electro-optical apparatus comprises a television camera adapted to observe an interference pattern.

* * * * *